United States Patent [19]

Leikert

[11] Patent Number: 4,642,225
[45] Date of Patent: Feb. 10, 1987

[54] METHOD OF BINDING SULFUR COMPOUNDS BY ADDING ADDITIVES

[75] Inventor: Klaus Leikert, Gummersbach, Fed. Rep. of Germany

[73] Assignee: L. & C. Steinmüller GmbH, Gummersbach, Fed. Rep. of Germany

[21] Appl. No.: 681,223

[22] Filed: Dec. 13, 1984

[30] Foreign Application Priority Data

Dec. 15, 1983 [DE] Fed. Rep. of Germany ....... 3345330

[51] Int. Cl.$^4$ .......................... C01B 17/00; B01J 8/00
[52] U.S. Cl. .................................... 423/244; 423/242; 110/343; 110/345
[58] Field of Search .......... 423/244 A, 242 A, 242 R, 423/244 R; 110/345, 343

[56] References Cited

U.S. PATENT DOCUMENTS

| | | | |
|---|---|---|---|
| 2,718,453 | 9/1955 | Beckman | 423/244 |
| 3,343,908 | 9/1967 | Wickert | 423/244 |
| 4,178,349 | 12/1971 | Weinert | 423/244 |
| 4,509,436 | 4/1985 | Schrofelbauer et al. | 110/345 |
| 4,559,211 | 2/1985 | Feldman et al. | 423/242 |

FOREIGN PATENT DOCUMENTS

| | | |
|---|---|---|
| 0038961 | 4/1981 | European Pat. Off. . |
| 0049585 | 4/1982 | European Pat. Off. . |
| 0077170 | 4/1983 | European Pat. Off. . |
| 2539500 | 3/1977 | Fed. Rep. of Germany . |
| 84-00903 | 3/1984 | PCT Int'l App. . |
| 1503692 | 3/1978 | United Kingdom . |
| 1504688 | 3/1978 | United Kingdom . |
| 2002728 | 2/1979 | United Kingdom . |
| 2008432 | 6/1979 | United Kingdom . |
| 2014975 | 9/1979 | United Kingdom . |
| 2021086 | 10/1979 | United Kingdom . |
| 1578149 | 11/1980 | United Kingdom . |

OTHER PUBLICATIONS

Falkenberry et al, "SO$_2$ Removal by Limestone Injection" Chemical Engineering Progress vol. 65, No. 12, pp. 61–66, 1969.

*Primary Examiner*—Gregory A. Heller
*Attorney, Agent, or Firm*—Becker & Becker

[57] ABSTRACT

A method of binding sulfur compounds which are produced as reaction products during the combustion of sulfur-containing fuels in a charging bed or fluidized bed furnace at temperatures above 1000° C. The method is effected by the addition of additives. The hot flue gases exiting directly from the charging bed or fluidized bed furnace pass through a cooling zone to lower the flue gas temperature to below 1000° C. After this cooling zone, the additives are introduced into the cooled-off flue gas flow via a carrier medium. The charging bed or fluidized bed furnace for carrying out this method includes cooling surfaces for cooling the hot flue gases in the cooling zone. These cooling surfaces are disposed directly above the furnace surface and below the additive introduction surface. Cooling of the flue gases in the cooling zone can be effected by blowing in low-temperature flue gas between the upper edge of the furnace surface and the lower edge of the additive introduction surface.

8 Claims, 3 Drawing Figures

METHOD OF BINDING SULFUR COMPOUNDS BY ADDING ADDITIVES

BACKGROUND OF THE INVENTION

1. Field of the Invention

The present inention relates to a method of binding sulfur compounds which are produced as reaction products during the combustion of sulfur-containing fuels in a charging bed or fluidized bed furnace at temperatures above 1000° C., with the method being effected by the addition of additives. The present invention also relates to the utilization of this method with chargin bed or fluidized bed furnaces.

2. Description of the Prior Art

Sulfur dioxide is produced when sulfur-containing fuels are burned in chargin bed or fluidized bed furnaces. There is known that this sulfur dioxide can be bound by addition additives to fluidized bed furnaces which are operated at temperatures below 1000° C. Above these temperatures, the desulfurization effect is reduced due to the effect of temperature on the reaction. The high temperature can trigger phenomena which have an adverse effect on the operation of the furnace, such as the formation of slag on the heating surfaces of charging bed furnaces, or the formation of slag in the fluidized bed of fluidized bed furnaces.

An object of the present invention, while retaining the previously mentioned type of furnace, is to provide a sulfur-binding in the resulting flue gases by adding additives at a location at which the conditions are maintained which avoid the aforementioned drawbacks.

BRIEF DESCRIPTION OF THE DRAWING

This object, and other objects and advantages of the present inention, will appear more clearly from the following specification in conjunction with the various embodiments schematically illustrated in the drawing, in which.

SUMMARY OF THE INVENTION

The method of the present invention is characterized primarily in that the hot flue gases, which exit directly from the charging bed or fluidized bed furnace, pass through a cooling zone to lower the flue gas temperature to below 1000° C.; after, i.e. downstream from, this cooling zone, the additives are introduced into the cooled-off flue gas flow by means of a carrier medium.

The inventive method is particularly suitable for charging bed or fluidized bed furnaced. There is therefore proposed that the cooling of the hot flue gases be effected in the cooling zone via cooling surfaces which are disposed directly above the furnace surface and below the additive introduction surface.

However, there is also possible to effect cooling of the flue gases in the cooling zone by blowing in low-temperature flue gas between the upper edge of the furance surface and the lower edge of the additive introduction surface.

Pursuant to a further proposal of the present invention, air can be used in place of low-temperature flue gas to lower the temperature of the flue gas.

Pursuant to the present invention, either low-temperature flue gas or air can be used as the carrier medium for the additive. In addition to the desired cooling effect, the oxygen contained in this carrier medium at the same time is utilized for an after burning.

The advantages achieved with the present inventio consist in that, due to an appropriate cooling above the furnace system to a temperature below 1000° C., the reactivity of the additives which are added is nearly completely optimally utilized, and in that the furnace system itself, despite the high temperatures which exist there, can produce no phenomena which ahve an adverse effect on the operation.

Reference has been made to the addition of additives. These additives can be oxides and hydroxides of metals, such as of sodium, potassium, aluminum, barium, cadmium, calcium, copper, iron, lead, magnesium, manganese, and zinc. The additives also could be pulverized calcium carbonate, magnesium carbonate, or dolomite.

There is possible to introduce the additive into the flue gases by means of water as the carrier medium flow, with the additive being suspended in the water.

DESCRIPTION OF PREFERRED EMBODIMENTS

Figure 1:
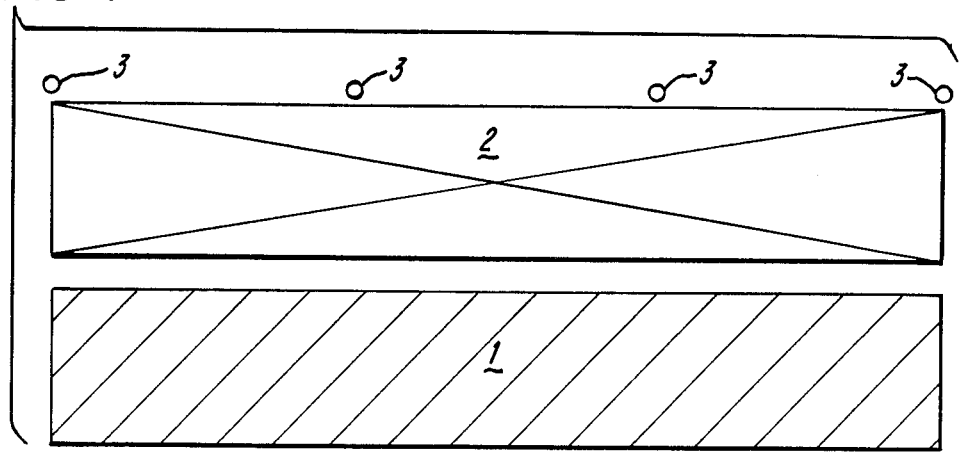
FIG. 1 diagrammatically shows a fluidized bed or charging bed above which are disposed cooling surfaces, with outlets being provided above the cooling surfaces for introducing additive into the flue gas.

Referring now to the drawing in detail, the fluidized bed or chargin bed is designated with the reference numeral 1. Cooling surfaces 2 are used in the embodiment of FIG. 1 to cool the flue gases to temepratures below 1000° C. The addition of additives is effected via outlets 3 in a surface which is disposed directly above the cooling surfaces 2.

Figure 2:
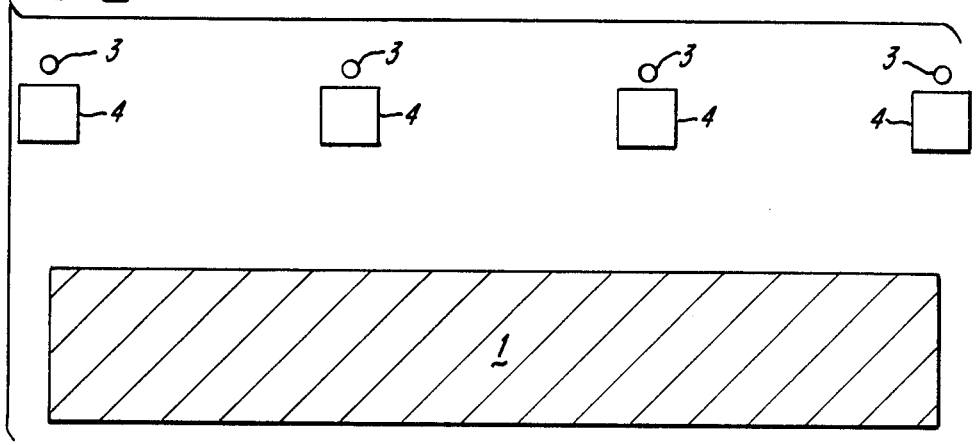
FIG. 2 diagrammatically shows a fluidized bed or charging bed, with low-temperature flue gas inlets being provided below the additive introduction outlets.

In the embodiment of FIG. 2, the flue gases are cooled by low-temperature flue gas; this is expediently effected via outlets 4 which are disposed directly below the additive introduction surface 3, with the addition of additive being effected separately.

Figure 3:
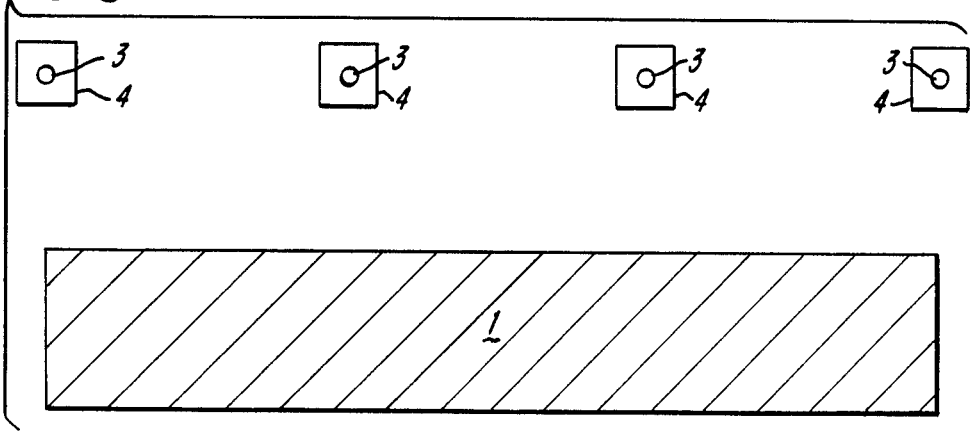
FIG. 3 diagrammatically shows a fluidized bed or charging bed, with low-temperature flue gas being added simultaneously with the additives in the additive introduction surface.

In FIG. 3, the low-temperature flue gas introduction surface 4 coincides with the additive introduction surface 3. In other words, the additive and the low-temperature flue gas are introduced simultaneously in to the flue gas which orginates from the charging bed or fluidized bed furnace.

The present invention is, of course, in no way restricted to the specific disclosure of the specification and drawing, but also encompasses any modifications within the scope of the appended claims.

What I claim is:

1. A method of binding sulfur oxide compounds which are produced as reaction products during the combustion of sulfur-containing fuels in a charging bed or fluidized bed furnace at temperatures above 1000° C. that have adverse effects on reaction temperature as well as upon operation of the furnace resulting in formatio of slag on surfaces of the furnace, said method including the step of adding additives to the flue gases coming from said furnace; the method comprising the steps of:

passing the hot flue gases as they exit directly from said charging bed or fluidized bed furnace so that the hot flue gases first go through a cooling zone wherein the hot flue gases themselves are cooled to lower the temperature of said flue gases to a value of temperature that is below 1000° C. and that is aimed at an optimum reaction temperature to effect the binding of sulfur oxide compounds in accordance with the additives to be employed, the cooling zone for the flue gas directly after leaving the furnace representing a feature arranged prior to actual flue-gas-waste-heat utilization;

only thereafter introducing said additives into said cooled-off flue gases via a carrier medium at a location at which conditions are maintained that avoid the adverse effects on reaction temperature as well as upon operation of the furnace resulting in formation of salg on surfaces of the furnace; and using additives selected from the group consisting of oxides and hydroxides of metals selected from the group consisting of sodium, potassium, aluminum, barium, cadmium, calcium, copper, iron, lead, magnesium, manganese, and zinc.

2. A method according to claim 1, which includes the step of effecting said cooling of said flue gases in said cooling zone by blowing in low-temperature flue gas above the level of said furnace and below the level of additive introduction.

3. A method according to claim 1, which includes the step of effecting said cooling of said flue gases in said cooling zone by blowing in low-temperature flue gas above the level of said furnace, said low-temperature flue gas at the same time serving as said carrier medium for said additives.

4. A method according to claim 1, which includes the step of effecting said cooling of said flue gases in said cooling zone by blowing in air.

5. A method according to claim 1, in which said carrier medium is water, with said additives being suspended in said water.

6. A method of binding sulfur oxide compounds which are produced as reaction products during the combustion of sulfur-containing fuels in a chargin bed or fluidized bed furnace at temperatures above 1000° C. that have adverse effects of reaction temperature as well as upon operation of the furnace resulting in formation of slag on surfaces of the furnace, said method including the step of adding additives to the flue gases coming from said furnace; the method comprising the steps of:

passing the hot flue gases as they exit directly from said charging bed or fluidized bed furnace so that the hot flue gases first go through a cooling zone wherein the hot flue gases themselves are cooled to lower the temperature of said flue gases to a value of temperature that is below 1000° C. and that is aimed at an optimum reaction temperature to effect the binding of sulfur oxide compounds in accordance with the additives to be employed, the cooling zone for the flue gas directly after leaving the furnace representing a feature arranged prior to actual flue-gas-waste-heat utilization; and then only thereafter introducing said additives into said cooled-off flue gases via a carrier medium at a location at which conditions are maintained that avoid the adverse effects on reaction temperature as well as upon operation of the furnace resulting in formation of slag on surfaces of the furnace; and using additives in pulverous form selected from the group consisting of calcium carbonate, magnesium carbonate, and dolomite.

7. A method according to claim 1, which includes the step of providing said cooling zone with cooling surfaces to effect said cooling of said hot flue gases, said cooling surfaces being disposed directly above the level of said furnace and below the level of additive introduction.

8. A method according to claim 6, which includes the steps of providing said cooling zone with cooling surfaces disposed directly above the level of said furnace and below the level of additive introduction, and blowing in said low-temperature flue gas above said cooling surfaces and directly below the level of additive introduction.

* * * * *